May 17, 1938. H. STUDER 2,117,749
COMPOSITE GRID GRILL
Filed Sept. 14, 1937

Inventor
Henri Studer

Patented May 17, 1938

2,117,749

UNITED STATES PATENT OFFICE 2,117,749

COMPOSITE GRID GRILL

Henri Studer, Zurich, Switzerland

Application September 14, 1937, Serial No. 163,818
In Switzerland September 19, 1936

3 Claims. (Cl. 53—5)

My invention relates to improvements in cooking grills of the composite or grid type, especially for use in connection with electric ranges or heating plates; and the objects of my improvement are, first, to provide means for adapting the said grill to irregularities in the surface of the range or plate; second, to afford means for eliminating any warping of the grill on account of local heat differences; and third, to afford facilities for a quick and easy cleaning of the grill.

I attain these objects by the grid grill illustrated in the accompanying drawing, in which—

Figure 1:
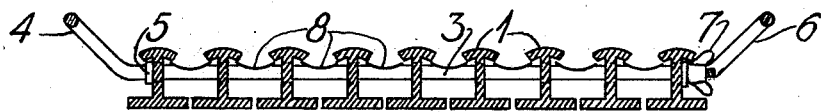
Figure 2:
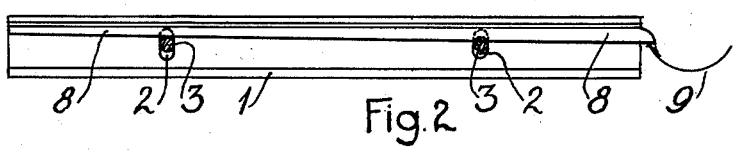

Fig. 1 is a vertical transverse section of the grill;

Fig. 2, a vertical longitudinal section between two elements of the grill; and

Figure 3:
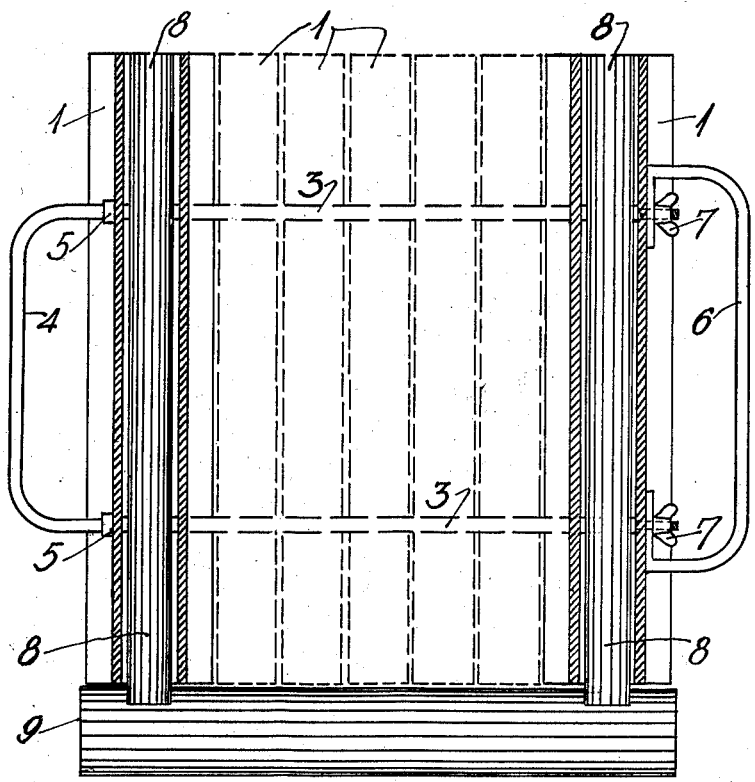

Fig. 3, a simplified horizontal section with duplicate portions merely suggested; the cutting plane lying above the cross bars.

The grill elements 1 are I-shaped in section, are made of cast iron and possess a curved top and a straight, wide bottom flange. When in use, the grill rests on an electric heating plate which is not shown in the drawing. Each element 1 is provided with two oval apertures 2 for the purpose of forming a grid by inserting the two legs 3 of a U-shaped handle bar 4. The left-hand outside element 1 is abutting against the shoulder 5 of the said leg 3; these shoulders also may be welded to the web of the said outside element. The right-hand outside element 1 abuts against the shoulders of the stepped-down and threaded ends of the said legs 3. The latter also receive the inwardly bent ends of the individual right-hand grip 6. Wing nuts 7 lock the said right-hand element 1, the legs 3 and the grip 6 in place.

With the grip 6 removed, the said grid elements 1 may be aligned upon the legs 3; a small gap between any two of the said elements 1 is to be left in order to let the hot gases rise upwardly and in order to allow the elements 1 to adapt themselves, relative to one another, to an uneven or warped electric heating plate. This adjusting movement of the elements 1 is facilitated by the said oval openings 2 which allow the said legs 3 to drop and rise. In this way a good contact of the elements 1 with the electric heating plate is obtained, which is very important for electric cooking.

The run-off gutters 8 conduct any drippings from the food being grilled to the front collecting trough 9. For this purpose the said gutters are put on a downward grade from the rear to the front of the grill. The said legs 3 for this purpose are provided with top recesses of different depth in which the said gutters rest.

The elements 1 are readily and easily cleaned by removing the grip 6 and taking them off the legs 3. Trough 9 and gutters 8 may readily be drawn forward and, after cleaning, slid back in again.

The said gutters 8 also could be put on a grade by providing holes 2 in the web of the elements 1 at different heights above the bottom flanges of the latter.

What I claim and desire to secure by Letters Patent is:

1. A composite grid grill, especially for use in connection with electric cooking, comprising a plurality of longitudinal cast-iron I-shaped grid-elements, detachable cross bars for holding together the said elements, oval apertures in the web of the said elements for permitting the latter to drop and rise relative to one another, and means for collecting the drippings off the food being grilled.

2. A composite grid grill, flexible in a crosswise direction, according to claim 1; the said collecting means comprising a trough extending over the front of the grill, a plurality of gutters each extending longitudinally between a pair of the said elements, and means for putting the said gutters on a grade from the rear to the front so as to direct the drippings off the food being grilled toward the said trough.

3. A composite grid grill—of the character described—according to claim 1, the said collecting means comprising a transversal front trough and longitudinal gutters, and circular depressions on the top of the said cross bars for the purpose of putting the said gutters onto a grade downward and forward into the said trough.

HENRI STUDER.